United States Patent
Zeadan

(10) Patent No.: US 9,522,441 B2
(45) Date of Patent: Dec. 20, 2016

(54) WELDING METHOD, WELDING DEVICE AND COMPOSITE PART

(75) Inventor: Jeihad Zeadan, Kelmis (BE)

(73) Assignee: Robert Bosch GmbH, Stuttgart (DE)

( * ) Notice: Subject to any disclaimer, the term of this patent is extended or adjusted under 35 U.S.C. 154(b) by 761 days.

(21) Appl. No.: 13/877,093

(22) PCT Filed: Sep. 21, 2011

(86) PCT No.: PCT/EP2011/066422
§ 371 (c)(1),
(2), (4) Date: Jun. 14, 2013

(87) PCT Pub. No.: WO2012/041747
PCT Pub. Date: Apr. 5, 2012

(65) Prior Publication Data
US 2013/0256283 A1 Oct. 3, 2013

(30) Foreign Application Priority Data
Sep. 30, 2010 (DE) .................. 10 2010 041 720

(51) Int. Cl.
*B23K 26/21* (2014.01)
*B23K 26/02* (2014.01)
(Continued)

(52) U.S. Cl.
CPC ............ *B23K 26/20* (2013.01); *B23K 26/032* (2013.01); *B23K 26/0823* (2013.01); *B23K 26/21* (2015.10); *B23K 26/02* (2013.01)

(58) Field of Classification Search
CPC ......... B23K 26/20; B23K 26/30; B23K 26/02; B23K 26/21
(Continued)

(56) References Cited

U.S. PATENT DOCUMENTS 4,270,496 A * 6/1981 Narasimhan ............ F01L 1/143
123/90.51
6,717,098 B2 * 4/2004 Matsushita ............ B23K 26/03
219/121.63
(Continued)

FOREIGN PATENT DOCUMENTS

CN 1840281 10/2006
DE 10 2007 059 262 6/2009
(Continued)

OTHER PUBLICATIONS

International Search Report for PCT/EP2011/066422 dated Feb. 6, 2012.

*Primary Examiner* — Samuel M Heinrich
(74) *Attorney, Agent, or Firm* — Norton Rose Fulbright US LLP; Gerard Messina

(57) ABSTRACT

A welding method, e.g., a laser welding method, for connecting a first workpiece to a second workpiece, includes a first method step in which the first and the second workpiece are brought into contact with each other; a second method step in which a desired welding distortion is ascertained; and a third method step in which the first and the second workpiece are welded to each other as a function of the welding distortion, and/or in which the first and the second workpiece are rotated about an axis of rotation at a rotational speed, the first and the second workpiece being welded to each other as a function of the rotational speed.

12 Claims, 4 Drawing Sheets

(51) Int. Cl.
*B23K 26/08* (2014.01)
*B23K 26/20* (2014.01)
*B23K 26/03* (2006.01)

(58) Field of Classification Search
USPC .................. 219/121.63, 121.64, 121.61, 121.62,219/121.78, 121.79
See application file for complete search history.

(56) References Cited

U.S. PATENT DOCUMENTS

| | | | |
|---|---|---|---|
| 7,557,325 B2* | 7/2009 | Fiechter | B21G 1/08 219/121.61 |
| 2002/0019726 A1 | 2/2002 | Crilly et al. | |
| 2006/0213878 A1 | 9/2006 | Namiki | |
| 2012/0061357 A1* | 3/2012 | Ramsayer | B23K 26/04 219/121.64 |

FOREIGN PATENT DOCUMENTS

| | | |
|---|---|---|
| DE | 10 2008 040 785 | 2/2010 |
| GB | 1333652 | 10/1973 |
| JP | 200152778 | 9/2001 |
| JP | 2003066267 | 3/2003 |
| JP | 2008151233 | 7/2008 |
| JP | 4157080 | 9/2008 |
| WO | WO2010/112266 | 10/2010 |

* cited by examiner

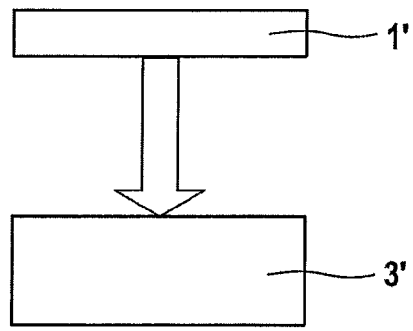
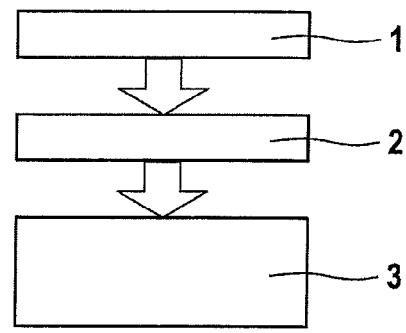
FIG. 1A        FIG. 1B
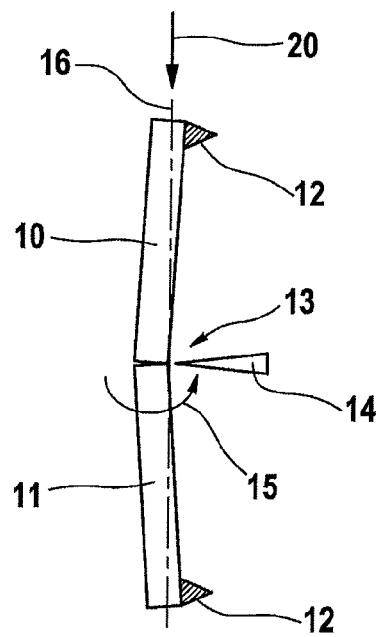
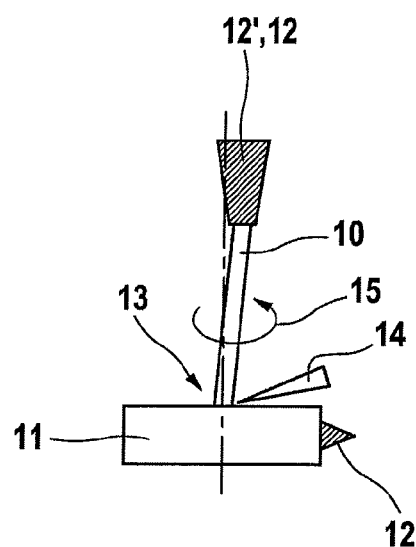
FIG. 2A        FIG. 2B

WELDING METHOD, WELDING DEVICE AND COMPOSITE PART

BACKGROUND OF THE INVENTION

1. Field of the Invention

The present invention relates to a device and a method for welding, e.g., using a laser.

2. Description of the Related Art

Such devices are generally known. From published German patent application document DE 10 2006 015 383 A1, for example, a device and a method are known for laser welding a first workpiece to a second workpiece, the device including a laser source and a sensor for the process monitoring of the welding process. The process monitoring is used in this case particularly to monitor the weld penetration depth, which is detected currently by an on line measurement by an optical camera, and is used as a controlled variable for the laser source. A determination of a welding distortion is not provided in this instance.

BRIEF SUMMARY OF THE INVENTION

The welding method according to the present invention and the composite part according to the present invention have the advantage over the related art that, before the welding process, a desired or a required welding distortion is ascertained which is implemented during the welding process. This has the result that, using the welding method, not only is a connection able to be produced between the first and the second workpiece, but in addition, a desired direction or deformation between the first and the second workpiece is achieved. In this way, one is able to compensate for malpositions or bending and deviations of the contact surfaces of the first and second workpiece, for example, during welding. Alternatively, the production of a desired bending in the vicinity of the welding seam is also conceivable, by inputting an appropriate bending parameter or by the direct input of a corresponding welding distortion. The welding distortion ascertained in this case is implemented in the third method step by the choice of the corresponding welding parameters. Consequently, a component is able to be implemented in an advantageous manner, which has the desired external geometry at a comparatively high precision. Up to now, such a high precision of the external geometry of the welded component has been achieved by a comparatively high precision of the joining surfaces of the individual joining partners, that is, of the first and second workpiece. In this context, the joining surfaces have to be planarized or ground ahead of time. By contrast to the related art, the method according to the present invention enables producing such a precise component without the joining surfaces of the first and second workpiece having to be pretreated in a comparatively effortful and cost-intensive manner. According to one further preferred refinement, or of a further subject matter of the present invention, in a third method step the first and the second workpiece are rotated about an axis of rotation at a rotational speed, in the method step, the first and the second workpiece are welded to each other as a function of the rotational speed. In an advantageous manner in this way, a uniform application of the welding energy into the first and second workpiece is possible, so that the material properties change symmetrically in the heat influx zone. In this way, on the one hand, the welding distortion is minimized and, on the other hand, a minimum concentric running is achieved. The method according to the present invention includes any welding method and particularly a beam welding method, such as laser or arc welding.

According to one preferred refinement, it is provided that, in the second method step, a malposition between the first and the second workpiece is detected, the welding distortion being ascertained as a function of the compositional and particularly for the compensation of the malposition. Thus, in an advantageous manner, the compensation of a malposition between the first and the second workpiece is produced during the welding method. Consequently, the welding method functions at the same time to produce a fixed connection between the first and the second workpiece, and at the same time to align the connection between the first and the second workpiece. Consequently, pretreatment of the joining surfaces may be omitted. In particular, in the second method step this malposition is detected, and subsequently the necessary welding distortion for the compensation of this malposition is calculated. The actual compensation of the malposition takes place in the subsequent welding procedure, the process parameters of the welding are selected in such a way that the welding distortion produced has the effect of compensating for the malposition. By malposition within the meaning of the present invention one should understand any actual arrangement of the first and second workpiece which deviates from a desired setpoint arrangement, so that malposition should in no case be taken to mean necessarily deviations between the orientation of the first workpiece and the orientation of the second workpiece.

According to one further preferred refinement, it is provided that in the third method step the welding beam is set as a function of the welding distortion and/or the rotational speed, the focusing, the beam time and/or the direction of the welding beam being set relative to the first and/or second workpiece, and/or that a corresponding rotational angle is set as a function of the welding distortion. In an advantageous manner, because of a corresponding variation in the radiant power, the focusing and/or the beam direction, a variation of the welding distortion or an optimization of the welding seam is achieved. Thus, for example, by an increase or a reduction of the radiant power, a clear increase or diminution of the welding distortion is achieved. By an adjustment of the irradiation time and the irradiation energy in comparison to the feed rate or the rotational speed of the first and second workpiece, for instance, a comparatively homogeneous seam having a constant welding depth is produced without conspicuousness at the overlap.

According to one further preferred further development, it is provided that the welding beam is set in such a way, as a function of the rotational speed of the component, that an essentially uniform energy deposition is achieved in the first and second component, so that, in an advantageous manner, a comparatively low welding distortion is created, since the material properties in the heat influx zone change symmetrically.

According to one further refinement, it is provided that, in the third method step, the first and the second workpiece are rotated about an axis of rotation, the corresponding angle of rotation being set as a function of the welding distortion. The angle of rotation within the present invention particularly including the angle of alignment during the beginning of welding in relation to the desired welding distortion to be achieved, i.e. that angle between the welding beam and the composite at which the welding process is started. Particularly advantageously, in this context, the composite of the first and second workpiece is rotated about its own axis, the radiant power, in this instance, being constant over all angles of rotation, and thus a fixed and uniform connection being achieved between the first and the second workpiece. The angle of rotation is further advantageously set as a function of the welding distortion desired, since a variation in the angle of rotation permits a specified increased and/or reduced energy input in certain regions between the first and the second workpiece, whereby in a desired manner a corresponding effect on the resulting welding distortion is achieved. Furthermore, by the angle of rotation, the position of the overlapping region or of a subrange opposite to the overlapping region is determined.

According to one further preferred refinement it is provided that, in the third method step, after a complete concentric running of the first and second workpiece, an overlapping region is produced, the welding seam in the overlapping region covering itself. After one rotation of the composite construction of the first and second workpiece with respect to the welding beam by more than 360°, the welding seam produced begins to be covered by its own beginning region. By the choice of an appropriate angle of rotation, the size of the overlapping region is thus fixed, and in an advantageous manner the welding distortion depends directly on the size of the overlapping region.

According to a further preferred refinement, it is provided that, in the third method step, the size of the overlapping region is set as a function of the welding distortion and/or in the overlapping region a reduced radiant power is set. In an advantageous manner, the welding distortion may be set by the size of the overlapping region on one side of the two workpieces, a smaller overlapping region producing a smaller welding distortion in the direction of the overlapping region, and an enlarged overlapping region producing a larger welding distortion in the direction of the overlapping region.

According to one further preferred refinement it is provided that, in the third method step, in a subrange opposite the overlapping region with regard to a rotation by 180°, an increased radiant power is set and/or an additional radiation dose is summoned up. An increased radiant power or an additional radiant dose in a subrange lying opposite to the overlapping region leads to a welding distortion which is opposite to the welding distortion in the direction of the overlapping region, so that the welding distortion in the direction of the overlapping region is at least partially compensated for or is overcompensated. The resulting welding distortion is thus controllable. In this context, the compensation in the subrange during the first concentric running of the first and second workpiece is able to be implemented by an increased radiant power in the subrange, and in an advantageous manner, the welding process requiring no additional time and/or no additional concentric rotation compared to the related art. Alternatively, the compensation in the subrange is to be realized by an additional radiant dose in the subrange, which is irradiated into the subrange in a second concentric running. This has the advantage that no increased radiant power is required.

According to a further preferred development, it is provided that, in the third method step, the radiant power is regulated as a function of time and/or the rotational motion in such a way that the radiant power has a pulse form in which the pulse length preferably corresponds to a rotation of the first and the second workpiece between 500 and 1200 degrees. In this context, the active welding range is contained during ramping out. At the beginning, stress peaks present in this instance from the preprocessing processes in the first and/or second workpieces are relieved, while subsequently a uniform stress of the first and second workpiece is attained, so that the distortion at the end of the welding process advantageously remains minimal.

An additional subject matter of the present invention is a welding device. In this case, a determination between the first and the second workpiece is detected using the detection unit or the first and second workpiece is rotated during the welding process, the welding beam being set as a function of the rotational motion. This has the advantage, on the one hand, that a required welding distortion for the correction or compensation of the malposition is to be calculated from the malposition that is used for setting the welding parameters in a subsequent welding process. The welding device according to the present invention thus permits not only the production of a fixed connection between the first and the second workpiece, but beyond that, additionally an aligning of the connection between the first and the second workpiece during welding, so that a component of the first and second workpiece is able to be produced having the outer geometry desired. On the other hand, as good as possible a concentricity is made possible by a constant optimization of the welding capacity. Moreover, a reduction in the energy requirement needed is to be attained. This welding device is particularly suitable for welding oblong workpieces, especially pipe-like or rod-like ones, since in this case a malposition between the first and the second workpiece, for instance due to joining surfaces that are not plane-parallel of the first and the second workpieces, has a particularly great effect. Furthermore, thus in an advantageous manner, a comparatively good linear movement of the first and/or second workpiece may be achieved even in the case of not plane-parallel joining surfaces of the initial workpieces.

According to one preferred further development, it is provided that a controller of the welding head and/or a driving arrangement of the mounting support are provided for the in-common moving of the first and second workpieces through the detection unit. To take into account, and for the correction of, the malposition, as was explained in detail above, the welding beam is set with respect to beam power, focusing and/or beam direction by the beam head and/or the relative position or rather the relative motion, i.e. particularly the angle of rotation, between the first and second workpiece on the one hand, and the welding beam on the other hand, by the driving device, and to produce the desired welding distortion, the beam head and/or the driving device being controlled indirectly or directly by the detection unit.

According to another preferred refinement, the detection unit encompasses an optical and/or mechanical detection unit. In an especially preferred manner, the optical detection unit includes laser beam optics which are used for a comparatively precise ascertainment of the malposition between the first and the second workpiece. Alternatively, the mechanical detection unit preferably includes a tactile detection unit, the malposition being "felt", or rather ascertained by touch. Furthermore, it is conceivable that the distortion is able to be detected by a simple measurement of the deformation of the workpiece and/or by the position of the workpiece holding support. It is obvious to one skilled in the art that the detection of the distortion may also be carried out using any other suitable method.

One further subject matter of the present invention is a composite part made of a first and second workpiece according to the method of the present invention and/or made using a welding device according to the present invention.

Exemplary embodiments of the present invention are illustrated in the drawings and explained in greater detail in the following description.

BRIEF DESCRIPTION OF THE DRAWINGS

FIG. 1a shows a schematic block diagram of a welding method according to the related art.

FIG. 1b shows a schematic block diagram of a welding method according to a first specific embodiment of the present invention.

FIGS. 2a and 2b show schematic side views of welding devices according to a first and a second specific embodiment of the present invention.

DETAILED DESCRIPTION OF THE INVENTION

Figure 3:
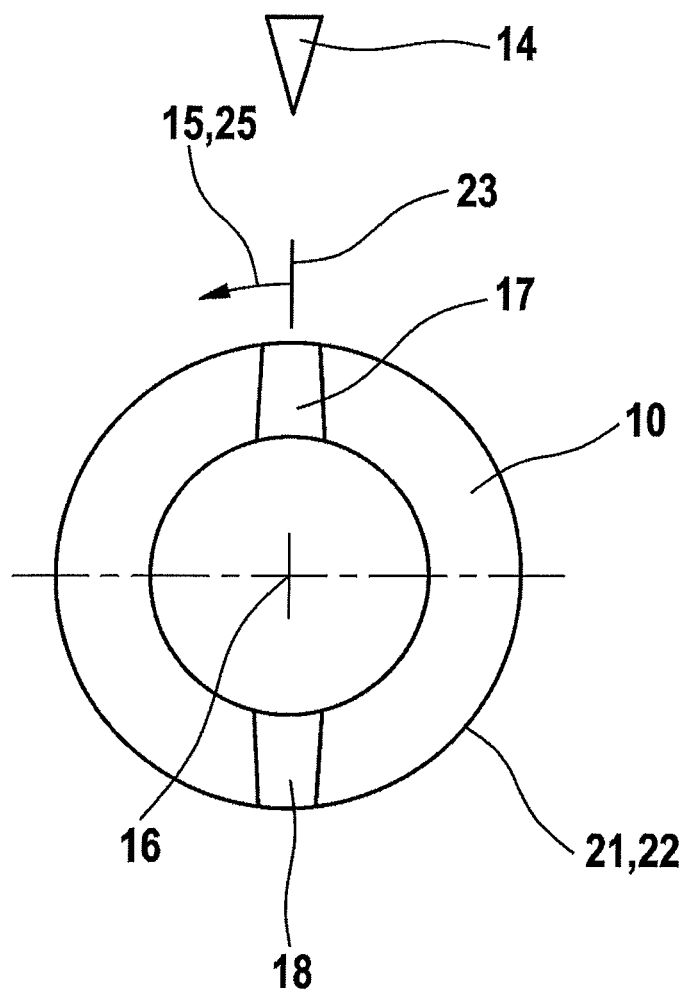
FIG. 3 a schematic top view of a welding device according to a third specific embodiment of the present invention.

FIG. 1a shows a schematic block diagram of a typical welding method according to the related art, in a first step 1', first of all a first and a second workpiece being clamped into a mounting support in such a way that they come into contact with each other at their joining surfaces. Subsequently, in a second step 3', the first and the second workpiece are set going by a driving device to an in-common rotational motion about a rotational axis, and the actual welding process is carried out. In the process, a welding beam, particularly a laser beam, is directed onto a contact location between the first and the second workpiece, and because of the rotational motion, the welding beam wandering along the periphery of the contact location, and consequently a welding seam is produced along the periphery, so that a fixed and completely encircling welding connection is produced between the first and the second workpiece.

FIG. 1b shows a schematic block diagram of a welding method according to a first specific embodiment of the present invention, the welding method according to the present invention being similar to the one illustrated in FIG. 1a, after clamping of the first and second workpiece into the mounting support in first method step 1, at first a necessary and/or desired welding distortion being ascertained in a second method step 2. For this, the composite of the first and the second workpiece is measured using a detection unit and an undesired malposition, or one that is to be corrected, between the first and the second workpiece is detected. In this context, particularly the actual arrangement made up of the first and the second workpiece is detected, and is compared to a setpoint arrangement. With the aid of the malposition detected, a required welding distortion is calculated, which is required for the compensation of the detected malposition, so that the arrangement of the first and second workpiece after completion of the welding process corresponds to the setpoint arrangement. Subsequently, in a third method step 3, the composite of the first and the second workpiece is set going on a rotational motion about the axis of rotation and the welding process is started. The welding process and the rotational motion of the composite are carried out, in this instance, as a function of the calculated welding distortion in such a way that after the termination of the welding process, the malposition is just compensated for by a resulting welding distortion, preferably the radiant power and/or the rotational motion of the composite of the first and the second workpiece being controlled as a function of the ascertained welding distortion. For the generation of this welding distortion the radiant power is particularly controlled as a function of the initial angle between the composite and the welding beam.

In FIGS. 2a and 2b, schematic side views are shown of welding devices according to a first and a second specific embodiment of the present invention, the welding devices being provided for carrying out a welding method shown in FIG. 1b according to the first specific embodiment of the present invention. The first specific embodiment shown in FIG. 1b includes a first and a second workpiece 10, 11, which are held in a mounting support 12. The main extension direction of first workpiece 10 and the main extension direction of second workpiece 11 are at an angle to each other which is not equal to 180 degrees, i.e. the first and the second workpiece 10, 11 are not exactly aligned parallel to each other. This may be caused, for example, by not plane-parallel joining surfaces of the first and the second workpiece 10, 11. The deviation between the orientation of the first and the second workpiece 10, 11 is designated in the following text as malposition. This malposition is ascertained using a detection unit (not shown), for instance, a laser beam optical system and, while taking into account this ascertained malposition, a welding distortion is calculated which is suitable for just compensating for the malposition after completing the welding process. Into contact region 13 between the first and the second workpiece 10, 11, a welding beam 14 is now irradiated by a welding head (not shown), so that the first and the second workpiece 10, 11 are connected to each other in contact region 13. First and second workpiece 10, 11 are driven by a driving device (not shown) in this instance, to execute an in-common rotational motion 15 about an axis of rotation 16. The radiant power of welding beam 14 and rotational motion 15 are set, in this instance, as a function of the calculated welding distortion, in order, simultaneously to the generation of the welding connection, to generate a resulting welding distortion in contact range 13, which will just compensate for the malposition. FIG. 2b shows a second specific embodiment, which is essentially identical to the first specific embodiment, second workpiece 11 including a block-shaped or round workpiece, and first workpiece 10 being clamped between second workpiece 11 and a mounting support in the form of a laterally elastic holding-down device 12'. Holding-down device 12' is elastic with respect to a lateral motion, that is, perpendicular to axis of rotation 16, and functions at the same time as a detection unit, the malposition of first workpiece 10 with respect to second workpiece 11 being measured by the lateral position of holding-down device 12'. Consequently, the malposition is zero if the lateral position of holding-down device 12' is situated exactly above the contact position or on axis of rotation 16.

FIG. 3 shows a schematic top view of a welding device 1 according to a third specific embodiment of the present invention, the third specific embodiment corresponding essentially to the first specific embodiment shown in FIG. 2a, and welding device 1 being imaged in a top view from a direction illustrated in FIG. 2a by arrow 20. In this context, welding beam 14 is irradiated onto the contact location between the first and the second workpiece 10, 11, and at the same time the composite of first and second workpiece is rotated about axis of rotation 16 relative to welding beam 14 about its own axis. In the process, a welding seam 21 is produced which extends along circumference 22 of the composite. In order to achieve a fixed welding connection, welding seam 21 is developed to be longer than circumference 22, so that welding seam 21 covers itself at initiation point 23 after one complete revolution of the composite by 360 degrees. The region in which welding seam 21 covers itself is designated as overlapping region 17. The welding distortion is usually directed in the direction of this overlapping region 17. In order to reduce such a welding distortion in the direction of overlapping region 17, a controller of welding beam 14, illustrated in FIG. 4c is conceivable, radiant power 24 of welding beam 14 being reduced in overlapping region 17. In one alternative specific embodiment, it is conceivable to apply an increased radiant power 24' during the first rotation of the composite, in a subrange 18 lying opposite to overlapping region 17 relative to axis of rotation 16, as is illustrated in FIG. 4b. Subrange 18 begins at a rotation of 180 degrees. Increased radiant power 24', in this case, acts compensatingly counter to the welding distortion in the direction of overlapping region 17. In a further specific embodiment, shown in FIG. 4a, it is conceivable that in further rotations of the composite, that is, for instance, in a rotation between 360 and 720 degrees, only subrange 18 is irradiated by an additional radiation dose 24". Because of this additional radiation dose 24", which is eradiated in a region beginning at 540 degrees, there is also achieved a compensation of the welding distortion in the direction of the overlapping region.

Figure 4A:
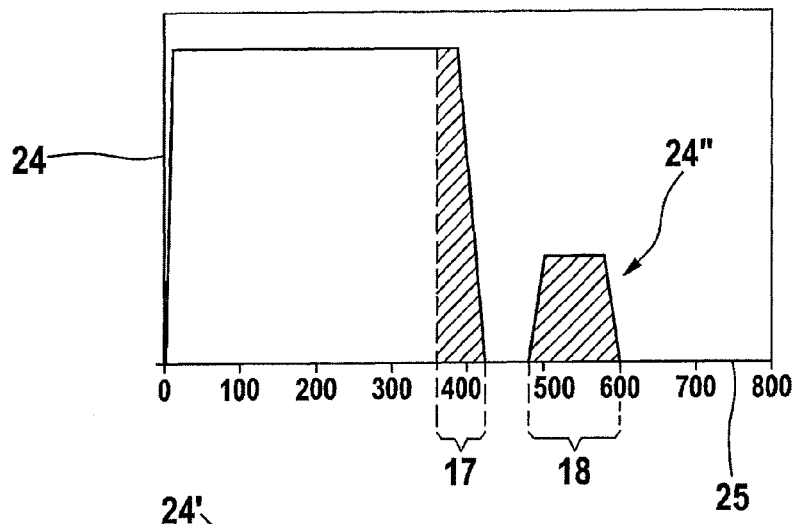
FIGS. 4a, 4b, and 4c show schematic representations of the radiant power as a function of the angle of rotation of the welding method according to a second, third and fourth specific embodiment of the present invention.
Figure 4B:
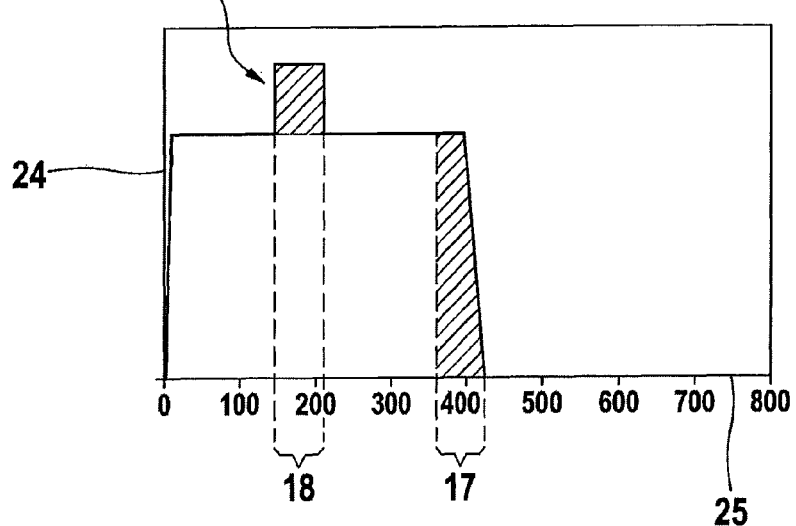
Figure 4C:
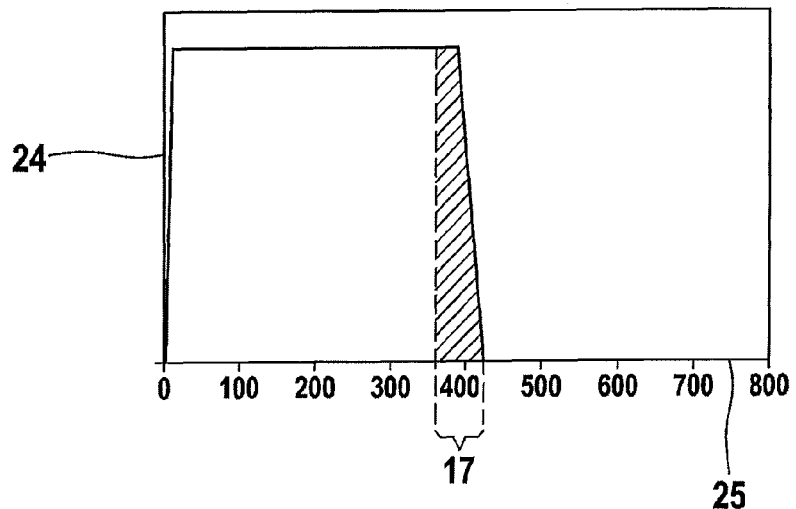

In FIGS. 4a, 4b, 4c, schematic representations of radiant power 24 are shown as a function of the angle of rotation 25 of the welding methods according to a second, third and fourth specific embodiment of the present invention. The different curve on the radiant power as a function of angle of rotation 25 has already been described in FIG. 3, and in FIGS. 4a, 4c and 4b on the abscissa in each case angle of rotation 25 being plotted in degrees, and on the ordinate in each case radiant power 24 or the equivalent radiation temperature being plotted. An angle of rotation 25 of zero degrees corresponds, in this case, to starting point 23. The radiation curve illustrated in FIG. 4a includes a uniform radiant power 24 during the first rotation (of 0 to 360 degrees), radiant power 24 in overlapping 17 (between 360 and ca. 400 degrees) being reduced to zero, and for the compensation of the welding distortion in the direction of overlapping region 17 during second rotations (for instance, from 360 to 900 degrees) outside the overlapping region and subrange 17, 18 a radiant power 24 of zero being set, and in subrange 18 or round about subrange 18 (ca. between 500 and 600 degrees) an additional radiation dose 24" is deposited. Radiant power 24 of additional radiation dose 24" is preferably less than the radiant power 24 irradiated uniformly during the first rotation.

The radiation curve illustrated in FIG. 4b shows a radiant power that is less overall during the first rotation, which is briefly increased only in subrange 18. This briefly increased radiant power 24' leads to a compensation of the welding distortion in the direction of overlapping region 17. In FIG. 4a a reduced radiant power 24 is shown, so that the welding distortion in the direction of overlapping region 17 is reduced overall. Because of these different curves of radiant power 24 as a function of angle of rotation 25, depending on the desired welding distortion, a partial or an exact compensation or an overcompensation of the welding distortion in the direction of overlapping region 17 is able to be set, so that the malposition is able to be corrected by an appropriate choice of radiant power 24 and/or of the rotational motion in a desired manner during the welding method.

Figure 5:
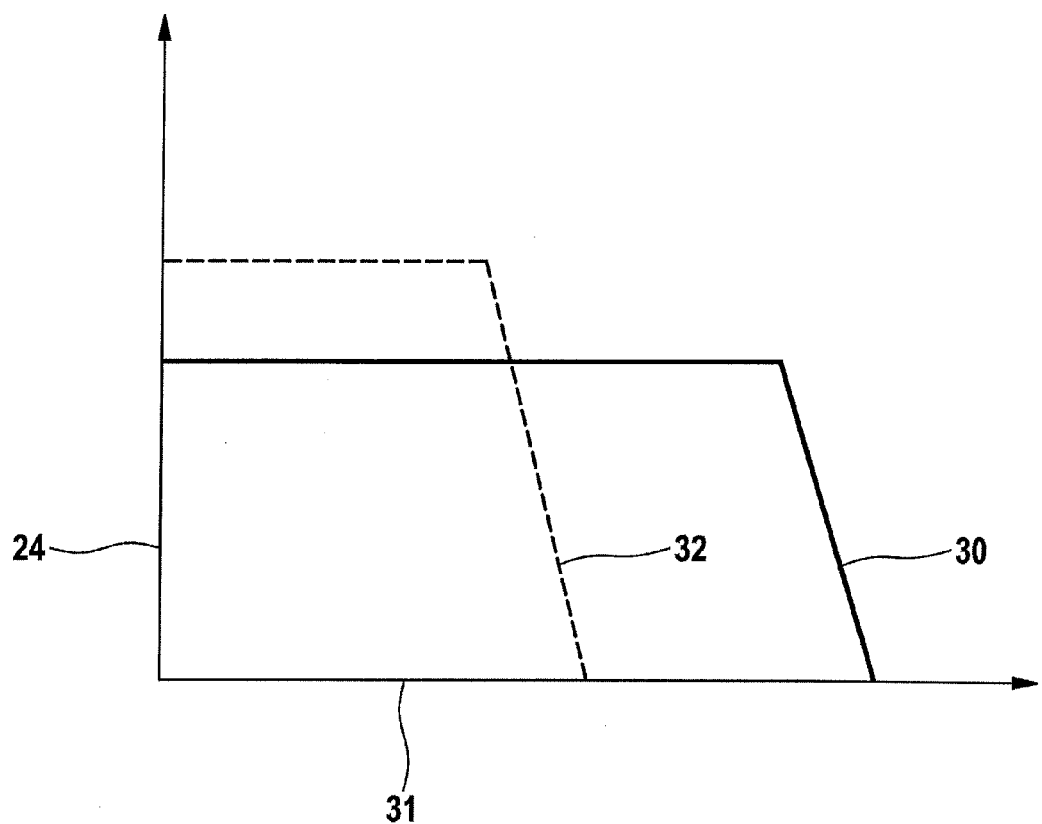
FIG. 5 shows a schematic representation of the radiant power as a function of the angle of rotation of the welding method according to a fifth specific embodiment of the present invention.

FIG. 5 shows a schematic representation of radiant power 24 as a function of time 31 of the welding method according to a fifth specific embodiment of the present invention. Radiant power 24 and the radiation time, in the welding method according to the present invention, are illustrated by line 30, regulated in this case as a function of time 31 and angle of rotation 25. The resulting pulse length in time units depends on the rotational speed used in the process and extends over 500 degrees, for example. For comparison, FIG. 5 further shows by line 32 the curve of radiant power 24 as a function of time 31 in response to a conventional welding process.

What is claimed is:

1. A laser welding method for connecting a first workpiece to a second workpiece, comprising:
    bringing the first workpiece and the second workpiece into an arrangement in which the first workpiece and the second workpiece contact each other;
    detecting a malposition between the first workpiece and the second workpiece;
    ascertaining a desired welding distortion as a function of the malposition to compensate for the malposition;
    selecting a parameter for applying a welding energy based on the ascertained desired welding distortion; and
    while the first workpiece and the second workpiece are in the arrangement in which the first workpiece and the second workpiece contact each other, simultaneously:
        rotating the first workpiece and the second workpiece about an axis of rotation; and
        applying the welding energy (a) onto the first workpiece and the second workpiece to form a composite of the first workpiece and the second workpiece, and (b) at a pulse length that is over a period during which the rotation of the first workpiece and the second workpiece includes more than a complete revolution about the axis of rotation.

2. The welding method as recited in claim 1, wherein the parameter is at least one of a focusing of a beam of the welding energy, a beam time of the beam, and a direction of the beam is set relative to at least one of the first workpiece and the second workpiece.

3. The welding method as recited in claim 1, wherein the parameter is an angle of rotation by which the first workpiece and the second workpiece are rotated during the application of the welding energy.

4. A laser welding method for connecting a first workpiece to a second workpiece, comprising:
    bringing the first workpiece and the second workpiece into an arrangement in which the first workpiece and the second workpiece contact each other; and
    subsequently, while the first workpiece and the second workpiece are in the arrangement in which the first workpiece and the second workpiece contact each other, simultaneously:
        rotating the first workpiece and the second workpiece about an axis of rotation; and
        applying a welding energy (a) onto the first workpiece and the second workpiece to form a composite of the first workpiece and the second workpiece, and (b) at a pulse length that is over a period during which the rotation of the first workpiece and the second workpiece includes more than a complete revolution about the axis of rotation;

wherein, as a function of a speed of the rotation of the first workpiece and the second workpiece in the rotating step, at least one parameter of a beam of the applied welding energy is set such that an essentially uniform energy deposition is achieved in the first workpiece and the second workpiece.

5. A laser welding method for connecting a first workpiece to a second workpiece, comprising:
bringing the first workpiece and the second workpiece into an arrangement in which the first workpiece and the second workpiece contact each other; and
subsequently, while the first workpiece and the second workpiece are in the arrangement in which the first workpiece and the second workpiece contact each other, simultaneously:
rotating the first workpiece and the second workpiece about an axis of rotation; and
applying a welding energy (a) onto the first workpiece and the second workpiece to form a composite of the first workpiece and the second workpiece, and (b) at a pulse length that is over a period during which the rotation of the first workpiece and the second workpiece includes more than a complete revolution about the axis of rotation, wherein the rotation of the first workpiece and the second workpiece during the period of the pulse length is 600 to 900 degrees.

6. The welding method as recited in claim 5, wherein:
the composite of the first workpiece and the second workpiece is circular shaped; and
the application of the welding energy generates a circular welding seam that extends along a circumference of the composite and that includes an overlap region in which two different segments of the welding seam overlap.

7. The welding method as recited in claim 5, wherein the welding energy is initially constant over substantially all of the pulse length, with a gradual ramp down of the welding energy at an end of the pulse length.

8. A laser welding method for connecting a first workpiece to a second workpiece, comprising:
bringing the first workpiece and the second workpiece into an arrangement in which the first workpiece and the second workpiece contact each other; and
subsequently, while the first workpiece and the second workpiece are in the arrangement in which the first workpiece and the second workpiece contact each other, simultaneously:
rotating the first workpiece and the second workpiece about an axis of rotation; and
applying a welding energy (a) onto the first workpiece and the second workpiece to form a composite of the first workpiece and the second workpiece, and (b) at a pulse length that is over a period during which the rotation of the first workpiece and the second workpiece includes more than a complete revolution about the axis of rotation;
wherein:
the composite of the first workpiece and the second workpiece is circular shaped;
the application of the welding energy generates a circular welding seam that extends along a circumference of the composite and that includes an overlap region in which two different segments of the welding seam overlap; and
in a subrange of the circular welding seam located opposite a starting point of the application of the welding energy, radiant power of the welding energy is increased.

9. A laser welding method for connecting a first workpiece to a second workpiece, comprising:
bringing the first workpiece and the second workpiece into an arrangement in which the first workpiece and the second workpiece contact each other; and
subsequently, while the first workpiece and the second workpiece are in the arrangement in which the first workpiece and the second workpiece contact each other, simultaneously:
rotating the first workpiece and the second workpiece about an axis of rotation; and
applying a welding energy (a) onto the first workpiece and the second workpiece to form a composite of the first workpiece and the second workpiece, and (b) at a pulse length that is over a period during which the rotation of the first workpiece and the second workpiece includes more than a complete revolution about the axis of rotation, wherein the rotation of the first workpiece and the second workpiece during the period of the pulse length is approximately two complete revolutions about the axis.

10. A laser welding method for connecting a first workpiece to a second workpiece, comprising:
bringing the first workpiece and the second workpiece into an arrangement in which the first workpiece and the second workpiece contact each other; and
subsequently, while the first workpiece and the second workpiece are in the arrangement in which the first workpiece and the second workpiece contact each other, simultaneously:
rotating the first workpiece and the second workpiece about an axis of rotation; and
applying a welding energy (a) onto the first workpiece and the second workpiece to form a composite of the first workpiece and the second workpiece, and (b) at a pulse length that is over a period during which the rotation of the first workpiece and the second workpiece includes more than a complete revolution about the axis of rotation, wherein the rotation of the first workpiece and the second workpiece during the period of the pulse length includes two complete revolutions about the axis.

11. A laser welding method for connecting a first workpiece to a second workpiece, comprising:
bringing the first workpiece and the second workpiece into an arrangement in which the first workpiece and the second workpiece contact each other; and
subsequently, while the first workpiece and the second workpiece are in the arrangement in which the first workpiece and the second workpiece contact each other, simultaneously:
rotating the first workpiece and the second workpiece about an axis of rotation; and
applying a welding energy (a) onto the first workpiece and the second workpiece to form a composite of the first workpiece and the second workpiece, and (b) at a pulse length that is over a period during which the rotation of the first workpiece and the second workpiece includes more than a complete revolution about the axis of rotation, wherein the welding energy is substantially constant over an entirety of the pulse length.

12. A welding device, comprising:
a welding head for generating a laser welding beam;
a mounting support configured to support a first workpiece and a second workpiece to be welded to each other;

a driving device configured to rotate the first workpiece and the second workpiece, while supported by the mounting support, about an axis of rotation; and a controller configured to control the welding head and the driving device to simultaneously:
- rotate, by the driving device, the first workpiece and the second workpiece about the axis of rotation; and
- apply, by the welding head, a welding energy (a) onto the first workpiece and the second workpiece to form a composite of the first workpiece and the second workpiece, and (b) at a pulse length that is over a period during which the rotation of the first workpiece and the second workpiece includes more than a complete revolution about the axis of rotation, wherein the rotation of the first workpiece and the second workpiece during the period of the pulse length is 600 to 900 degrees.

* * * * *